Dec. 21, 1948. C. C. RUTBELL 2,456,842
ROTARY CUTTER
Filed Oct. 13, 1943
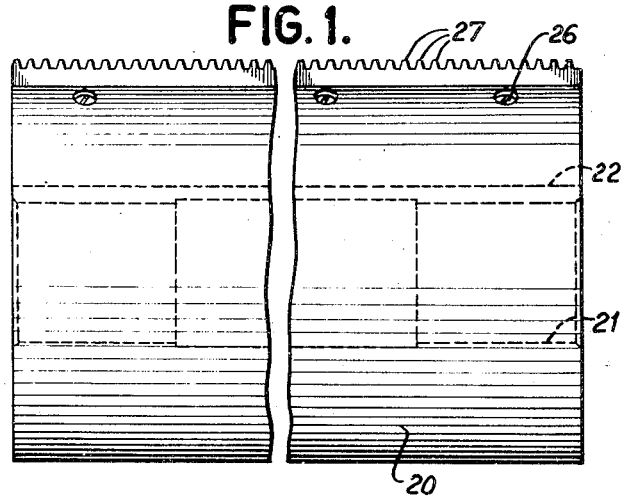
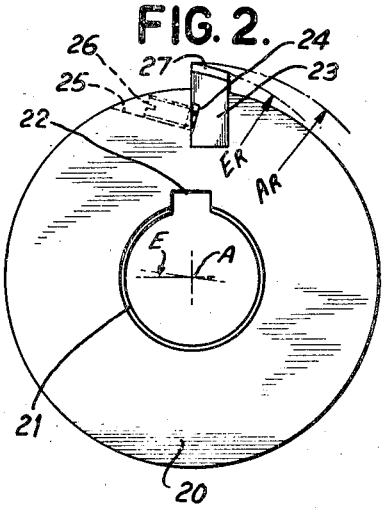
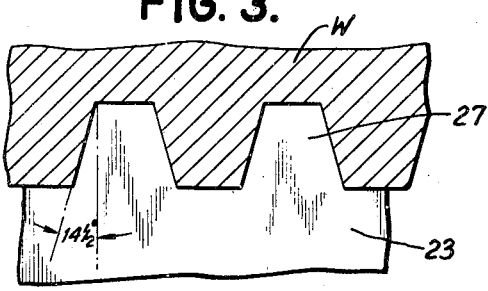
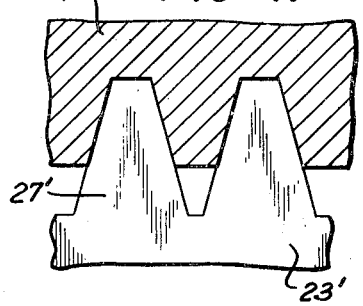
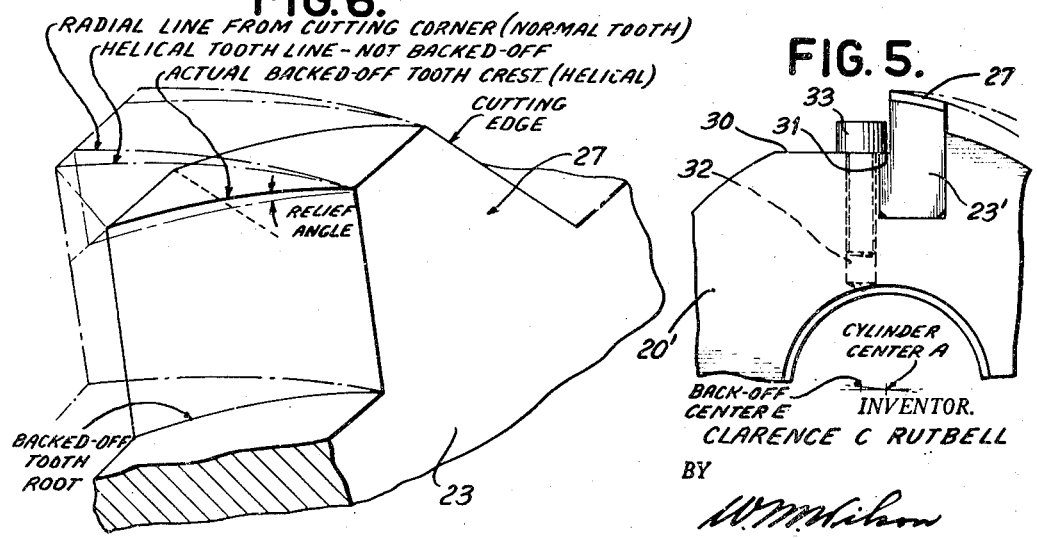
INVENTOR.
CLARENCE C RUTBELL
BY Patented Dec. 21, 1948

2,456,842

UNITED STATES PATENT OFFICE 2,456,842

ROTARY CUTTER

Clarence C. Rutbell, Endicott, N. Y., assignor to International Business Machines Corporation, New York, N. Y., a corporation of New York Application October 13, 1943, Serial No. 506,073

10 Claims. (Cl. 29—105)

This invention relates generally to an improved form of fly cutter and more particularly to a tool for cutting the teeth of a rack.

An object of the invention is the provision of a rack cutter having cutting teeth spaced more accurately and proportioned more truly than those of the prior art. This end is achieved by the use of a thread grinding machine to form the teeth of the cutter. Although the teeth are cut as portions of a helical thread, the extending helix edge does not interfere with cutting operations because the teeth are backed off and relief is provided by grinding the teeth from a center which is eccentric relative to the center of cutting operation. Such eccentric backing off does not change the shape of the cutting teeth at any given plane of cross section, with the result that successive sharpenings do not change the effective shape of the cutter teeth.

Another object of the invention is the provision of improved means for fastening a fly cutter tool bit in a holder.

A feature of the invention is the forming of multiple fly cutter teeth as successive parts of a helical thread.

A further object of the invention is the provision of back-off or relief clearance for helical cutting teeth.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a side elevation view of the rack cutter.

Fig. 2 is an end view of the cutter of Fig. 1.

Fig. 3 is a detail view showing the shape of the cutting teeth as cooperating with a work piece.

Fig. 4 is a detail view of an alternative tooth shape.

Fig. 5 is an end view of a cutter with a tool bit of an alternative form and having suitable securing means.

Fig. 6 is a diagrammatic view of a cutting tooth showing the relationship of actual tooth outline with respect to normal and helical tooth outlines and the effect of eccentric formation for backing off.

In Figs. 1 and 2 it is seen that a tool holder body or frame 20 is formed with a circular shaft or arbor opening 21 and a keyway 22. In the holder is ground or cut a rectangular groove to receive a tool bit or cutter bar 23, extending longitudinally along the holder. Along one wall of the bit is cut a sloping groove 24 which is at right angles to a series of tapped holes 25 containing screws 26 for securing the bit in the holder.

At the top of the projecting part of bit 23 is formed a series of rack cutting teeth 27 which are required to be accurately proportioned and very evenly and equally spaced. In forming these teeth, they are not cut in the conventional manner or shaped as plain rack cutting teeth. Instead, the tool with bar 23 as a blank is put in a thread grinding machine and teeth 27 are ground as parts or portions of what would be a complete helical thread around body 20, if the body extended to the outer edge of the bit. However, since teeth 27 are part of a helical thread, they lean to the side (Fig. 1) and have edges not confined to planes at right angles to the axis A of the holder. Therefore, in order to provide clearance for cutting operation, the teeth are ground to be backed off to form relief angles diverging away from the cutting edges and the cut material. As shown in Fig. 2, the center used for cutting the teeth as helical portions is not the axis A but the eccentric center E. This center E is not only eccentric with respect to A, but it is also removed from the plane at right angles to the plane including axis A and the cutting face of the teeth. In other words, in Fig. 2 the tooth 27 is seen to slope down to the right because it is generated from center E which is eccentrically and angularly disposed relative to center A. Both sides of the teeth also have cutting clearances instead of an opposing angle that one side of a helix would ordinarily have.

It is understood that the teeth are not necessarily ground while the bit is mounted in the holder 20. Special eccentric arbors and backing-off holders are used if the relief angle is so steep as to cause interference between the grinder and a holder of cylindrical shape.

The diagrammatic showing in Fig. 6 shows the difference between a normal tooth, a helical tooth and a backed-off or eccentrically ground helical tooth. The tooth 27 of the invention is shown in full lines with the cutting edges at the right. A line is pointed out as a normal tooth line, i. e., a radial line from the cutting corner. Such a line lies in a plane at right angles to the axis. Angularly disposed to the first line is the helical tooth line as it would be if not backed off. This angle is a measure of interference with cutting when the bit is arranged parallel with the axis of the holder but could be useful at the proper angle on the holder. However, by merely forming the helical portion eccentrically, proper relief angles or back-off is provided in all directions as noted by comparison of the full lines with those in phantom.

As an actual example, a tooth may be taken in a thread with a pitch of .1309 and a circumference of about 13 inches. This calls for a helix angle of about 0° 35'. Since the teeth have an angle of 14½° on a side, and the tangent of 14½° being .258, it is necessary to back off the tooth approximately four times 0° 35' to overcome the helix angle. In addition to this, it is necessary to back off about 4° for every actual 1° of clearance desired. Therefore, if there is a total of 9° of radial relief or back-off, a tooth has 9° clearance on top, 9/4—0° 35'=1° 40' on one side, and 9/4+0° 35'=2° 50' on the other side. The tooth form is correct despite these different clearances and cutting is performed satisfactorily.

The shape of the tooth is constant for all sections back of the initial cutting face. Since the tops of the teeth are ground in the same threading set-up, the result is a cutter that may be sharpened many times and still retain the same form.

In Figs. 3 and 4 the teeth 27 and 27' are shown as they cooperate with the work W to be cut. The long tooth 27' (Fig. 4) cooperates with a piece having a finished surface and requires no cutting by the root edges of the cutter teeth. Although both types of cutting teeth shown are of the Acme style, it is apparent that the advantages of the present invention are realized as well with other tooth forms.

In Fig. 5 is shown an alternative mode of securing the tool bar or bit 23'. There it is seen that the tool body or cylinder 26' not only is formed with a rectangular groove for receiving the bit, but alongside the groove is a flat area 30 which coincides with a shoulder 31 on the side of bit 23'. Extending inward perpendicular to flat 30 is a series of tapped holes 32 for receiving screws, the heads 33 of which overlap the groove wall and press down on shoulder 31 to hold the bit on the cylinder.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a fly cutter, a cylindrical tool body with a cutting tooth, said tooth formed as a portion of a helical thread, the axis of generation of said helical thread being eccentric with respect to the axis of said tool body to back off the tooth surfaces enough to provide relief angles on all sides.

2. In a fly cutter, a cylindrical tool frame with a plurality of spaced and axially aligned rack cutting teeth, said teeth formed as parts of a thread which if completed would be a continuous helical thread, the axis of generation of said thread being eccentric with respect to the axis of said frame, said eccentricity being sufficient to back off the tooth surfaces more than the interference of the helix angle.

3. In a fly cutter, a cylindrical tool body formed with an outer axial groove, a rectangular tool bit fitted in said groove, means for securing said bit to said tool body, said bit being formed with a series of regularly spaced cutting teeth, each tooth being a portion of a helical thread, the surfaces of each tooth being backed off and generated from a center which is eccentric with respect to the axis of the cylindrical tool body whereby the tooth surfaces are backed off to provide a relief angle and more than compensate for the interference of the helix angle.

4. In a multiple toothed rack cutter, a cylindrical tool holder formed with an inner axial opening and keyway and an outer rectangular groove extending axially, a rectangular tool bit fitted in said groove and extending above the periphery of said holder, a series of screws in said holder and cooperating with said bit to secure it to said holder, the extending portion of said bit being formed with a series of evenly spaced rack cutting teeth, each tooth being a portion of a helical thread, said thread being generated from a center eccentric with respect to the center of said holder whereby the parts of the teeth behind the cutting edge are backed off for end and side relief to overcome the interference of the helix angle.

5. As an article of manufacture, a rack cutter having a plurality of teeth which are portions of a helical thread, said teeth being backed off eccentrically to provide enough clearance to compensate for the interference of the helix angle.

6. As an article of manufacture, a multiple toothed fly cutter comprising a cylindrical portion and an outer axial cutting rib, said rib being formed with teeth each of which is a portion of a helical thread, said teeth being backed off for clearance sufficiently to compensate for the interference of the helix angle and provide a relief angle.

7. In a cutter, a cylindrical tool body with a cutting tooth of sloping sides, said tooth being formed as a portion of a helical thread, the axis of generation of said helical thread being eccentric with respect to the axis of said tool body to provide a back off clearance angle, the resulting side clearance angle overcoming the helix interference angle being found by the following formula:

$$\text{Resulting side clearance angle in degrees} = \text{tooth slope angle} \times \text{tangent of} \begin{pmatrix} \text{given back off} \\ \text{angles in} \\ \text{degrees} \end{pmatrix} - \begin{pmatrix} \text{helix angle} \\ \text{in degrees} \end{pmatrix}$$

8. In a fly cutter, a cylindrical tool frame with a plurality of axially aligned and regularly spaced rack cutting teeth with sloping sides, said teeth being formed as parts of a thread which if completed would be a continuous helical thread, the axis of generation of said thread being eccentric with respect to said frame to provide a top tooth clearance angle and a side clearance angle, the required top angle to overcome the interference of the helix angle being found by the following equation:

$$\text{Required top angle} = \frac{\text{desired side clearance angle} + \text{helix angle}}{\text{tangent of tooth slope angle}}$$

9. As an article of manufacture, a rack cutter having at least one cutting tooth which is a portion of a helical thread, said tooth having sloping sides and being backed off at an angle to provide a side clearance angle to more than compensate for the interference of the helix angle, said back off clearance angle being found by the following formula:

$$\text{Needed back off angle in degress} = \frac{\text{specified side clearance angle in degrees}}{\text{tangent of tooth slope angle}} + \text{helix angle in degrees}$$

10. As an article of manufacture, a rack cutter having a plurality of axially aligned and evenly spaced teeth, said teeth being portions of a helical Acme thread, said teeth being backed off eccentrically to provide a top clearance angle and a side clearance angle, the required amount of eccentricity being found by the following equation:

$$\text{Distance of eccentricity} = \text{outside diameter of thread} \times \tan\left(\frac{\text{Desired side clearance angle} + \text{helix angle}}{.258}\right)$$

CLARENCE C. RUTBELL.

REFERENCES CITED

The following references are of record in the file of this patent:

UNITED STATES PATENTS

| Number | Name | Date |
|---|---|---|
| 45,294 | Brown | Nov. 29, 1864 |
| 1,348,304 | Muller | Aug. 3, 1920 |
| 1,358,998 | Stauder | Nov. 16, 1920 |
| 1,778,260 | Kearney | Oct. 14, 1930 |
| 1,849,160 | Walker | Mar. 15, 1932 |
| 1,874,536 | Irwin | Aug. 30, 1932 |
| 2,079,785 | Ackley | May 11, 1937 |
| 2,273,050 | Kruse | Feb. 17, 1942 |
| 2,315,147 | Wildhaber | Mar. 30, 1943 |